United States Patent
Holtman

(10) Patent No.: US 9,885,775 B2
(45) Date of Patent: Feb. 6, 2018

(54) DETERMINING ORIENTATION

(71) Applicant: PHILIPS LIGHTING HOLDING B.V., Eindhoven (NL)

(72) Inventor: Koen Johanna Guillaume Holtman, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/900,678

(22) PCT Filed: Jun. 26, 2014

(86) PCT No.: PCT/EP2014/063464
§ 371 (c)(1),
(2) Date: Dec. 22, 2015

(87) PCT Pub. No.: WO2015/000772
PCT Pub. Date: Jan. 8, 2015

(65) Prior Publication Data
US 2016/0154088 A1  Jun. 2, 2016

(30) Foreign Application Priority Data
Jul. 4, 2013 (EP) .................................. 13175096

(51) Int. Cl.
*G06K 9/00* (2006.01)
*G01S 5/16* (2006.01)
(Continued)

(52) U.S. Cl.
CPC ................ *G01S 5/163* (2013.01); *F21S 8/04* (2013.01); *G01S 5/16* (2013.01); *G06T 7/70* (2017.01);
(Continued)

(58) Field of Classification Search
CPC ................ G06K 9/00; G01S 5/00; G06T 7/00
(Continued)

(56) References Cited

U.S. PATENT DOCUMENTS 8,100,552 B2 * 1/2012 Spero ........................ B60Q 1/04
362/227
9,699,856 B2 * 7/2017 Roberts .............. H05B 33/0854
(Continued)

FOREIGN PATENT DOCUMENTS

WO  2013016439 A1  1/2013

OTHER PUBLICATIONS

Fernandes, Claudio Dos S., et al., "A Low-Cost Localization System Based on Artificial Landmarks," Departamento De Ciencia Da Computacao, Oct. 2012, (6 Pages).
(Continued)

*Primary Examiner* — Abolfazl Tabatabai
(74) *Attorney, Agent, or Firm* — Meenakshy Chakravorty

(57) ABSTRACT

A luminaire is provided for use in determining an orientation of a camera based on an image of the luminaire captured by the camera. The luminaire comprises a light source having an on state in which it emits light and an off state in which it does not emit light, and being of a shape having a symmetry in the off state. The luminaire also comprises a controller configured to control the light source to emit said light in the on state with a lighting effect that breaks said symmetry. A device comprising receives an image of the light source from a camera, and determines an orientation of the camera relative to the light source by performing a geometric perspective calculation based on the image of the light source. An ambiguity in the orientation is resolved by detecting the asymmetry in the light emitted by the light source.

14 Claims, 5 Drawing Sheets

(51) Int. Cl.
  *F21S 8/04* (2006.01)
  *H05B 37/02* (2006.01)
  *G06T 7/70* (2017.01)
  *G09G 5/08* (2006.01)
(52) U.S. Cl.
  CPC .................. *H05B 37/0209* (2013.01); *G06T 2207/30244* (2013.01)
(58) Field of Classification Search
  USPC .......... 382/106, 211; 345/157, 158; 351/312
  See application file for complete search history.

(56) References Cited

U.S. PATENT DOCUMENTS

| | | |
|---|---|---|
| 2005/0116667 A1 | 6/2005 | Mueller et al. |
| 2009/0085869 A1 | 4/2009 | Destura et al. |
| 2009/0284366 A1 | 11/2009 | Haartsen et al. |
| 2014/0043856 A1* | 2/2014 | Thompson ........... G02B 6/0065 362/613 |

OTHER PUBLICATIONS

Pang, Grantham Kwok Hung, "LED Location Beacon System Based on Processing of Digital Images," Article in IEEE Transactions on Intelligent Transportation Systems, Oct. 2001 (18 Pages).
Wang, Hongbo, et al, "Vision-Based Navigation for an Electric Wheelchair Using Ceiling Light Landmark," Journal of Intelligent and Robotic Systems 41:283-314, 2004 (32 Pages).
Sun, Yuandong, et al., "Real-Time Monocular Visual Self-Localization Approach Using Natgural Circular Landmarks for Indoor Navigation," Proceedings of the Dec. 2012 IEEE (6 Pages).

* cited by examiner

DETERMINING ORIENTATION

CROSS-REFERENCE TO PRIOR APPLICATIONS

This application is the U.S. National Phase application under 35 U.S.C. §371 of International Application No. PCT/EP2014/063464, filed on Jun. 26, 2014, which claims the benefit of European Patent Application No. 13175096.0, filed on Jul. 4, 2013. These applications are hereby incorporated by reference herein.

TECHNICAL FIELD OF THE INVENTION

The present disclosure relates to determining the orientation of a camera relative to a light source based on an image of that light source captured by the camera.

BACKGROUND OF THE INVENTION

There are several ways for a device such as a mobile phone or tablet to determine its location. Conventional techniques include the use of a satellite-based positioning system such as GPS (Global Positioning System), or trilateration based on signals communicated between the device and a plurality of base stations of a cellular network.

A further technique is described in WO 2013/016439. According to this, a plurality of light sources in a given location each broadcast a respective identifier in the form of a coded light signal modulated into the light emitted from that light source. A device such as a mobile phone can then use its in-built camera to read the identifier coded into the light from such a source, and this identifier can be used to look up coordinates of the light source. Thus the device can determine that it is roughly in the vicinity of this light source's coordinates. When multiple sources appear in the field of view of a camera, with all their identifiers known, then a form of triangulation can be performed to determine a more fine-grained location of the camera, and thereby the device.

SUMMARY OF THE INVENTION

Often a camera may only be able to see a single light source, e.g. when used indoors and facing upwards, and/or because a typical camera built into a device like a phone or tablet may only have a limited field of view. In such situations, this means that triangulation between light sources cannot be performed. It would be desirable to provide an alternative technique that does not necessarily rely on multiple different light sources being within view.

As disclosed herein, this may be achieved using a geometric perspective calculation to analyse the perspective distorted shape of a given luminaire as appearing in the captured image. However, one obstacle is that a typical light source tends to be of a symmetrical shape, e.g. symmetrical in the plane of a surface such as a ceiling on which the light source is to be mounted. For example the shape may have a rotational symmetry (an order of rotational symmetry being two or more), or a mirror symmetry (line symmetry). This introduces ambiguity into the calculation, e.g. a square looks the same from four different angles. Therefore based on conventional luminaires, a coded light detector would need to have at least two luminaires in its field of view in order to know its orientation from the image.

According to the present disclosure, a light effect may be introduced into the light emitted by the light source so as to break the symmetry, preferably an effect which is imperceptible to the human eye such as an asymmetrical coded light distribution modulated into the light at high frequency. When an image of the light source is captured by a camera, a geometric perspective calculation may be performed on the image to determine the orientation of the camera relative to the light source based on the asymmetric light distribution.

Hence according to one aspect disclosed herein, there is provided a luminaire for use in determining an orientation of a camera based on an image of the luminaire captured by the camera. The luminaire comprises a light source having an on state in which it emits light and an off state in which it does not emit light, a light source being of a shape having a symmetry and appearing with said symmetry in the off state. The luminaire also comprises a controller configured to control the light source to emit said light in the on state with a lighting effect that breaks said symmetry.

Preferably said lighting effect is imperceptible to human vision and perceptible to the camera. The light source thus emits the light with the appearance of symmetry to a human, whilst the lighting effect breaks the symmetry when detected by the camera.

In a preferred application, the luminaire is for mounting on a surface such as a ceiling, floor or wall defining a plane, and the symmetry is in the plane of said surface. In embodiments, the lighting effect used to break the symmetry has no symmetry in the plane of said surface.

To implement the asymmetry, the light source may be divided into asymmetric sections, and the controller may be configured to produce said lighting effect by emitting the light differently from the different sections.

The controller may be configured to produce said lighting effect using coded light.

The controller may be configured to produce said lighting effect by emitting differently coded light from each of said sections, or emitting coded light from one of the sections while emitting non coded light from another of the sections.

According to another aspect disclosed herein, there is provided a device for determining the orientation of a camera based on image data received from a camera, the image data comprising an image of a light source which emits light and is of a shape having a symmetry. The device comprises an image analysis module configured to determine an orientation of the camera relative to the light source by performing a geometric perspective calculation based on the image of the light source. The image analysis module is configured to resolve ambiguity in the orientation by detecting a lighting effect in the light emitted by the light source which breaks said symmetry.

Orientation refers to any measure of the direction from which the camera is facing the light source. The direction can be expressed for example in terms of two angles or a unit vector in a suitable directional reference frame. One example of a suitable directional reference frame is a 3D coordinate system where the positive Z axis faces upwards, and the positive X axis faces towards to the North on the horizon. Another example of a suitable directional reference frame is the 3D coordinate system that takes the geometric centre of the lamp or lamp housing as the (0,0,0) origin coordinate, and two predetermined physical markers on the outside of the lamp or lamp housing as the points through which e.g. a (1,0,0) unit vector and a (0,1,0) unit vector point. In embodiments, the geometric perspective calculation may also determine the distance of the camera relative to the light source based on the captured image of that light source. Distance is a measure of the magnitude of the space between the camera and the light source in a coordinate system. In combination, orientation and distance give a measure of position of the camera, e.g. which may be expressed in terms of coordinates or a vector relative to a fixed point in a (directional) reference frame, either relative to the light source or translated to some other reference point or frame. Thus the image analysis module may be configured to use the determined distance and orientation together to determine the position of the camera relative to the light source in question. For example, the position relative to the light source could be determined as a coordinate in a 3D (x,y,z) coordinate system, with the lamp at position (0,0,0), units in meters, the negative Z axis pointing downwards, and the positive X axis pointing towards the North on the horizon.

In further embodiments, if the device also has knowledge of the light source's absolute location on a map or the globe, it may also determine the absolute location of the camera by combining the information on the light source's absolute location with the camera's position relative to the light source. This determination may also require knowledge of e.g. how a directional reference frame grounded in the geometry of the lamp is oriented with respect to the north/south/east/west/up/down reference frame of a map or globe.

In a preferred application the device comprises the camera, the camera being housed in or physically mounted on the device, or otherwise substantially co-located and attached so as to move with the device. For example the device may be a mobile terminal such as a mobile phone or tablet. In such instances it may be assumed that the orientation of the device is substantially that of the camera. However, it is not excluded that the device is separate from the device, e.g. connected by a wire, wireless link or network, and that it desired to determine the orientation of the camera remotely.

Though an image of multiple light sources could optionally be used, the technique does not rely on multiple light sources being within the field of view and can determine distance information based on any number of light sourced from one upwards.

According to further aspects disclosed herein, there may be provided a corresponding method and/or computer program product for performing the operations of the luminaire and/or device disclosed herein.

BRIEF DESCRIPTION OF THE DRAWINGS

For a better understanding of embodiments disclosed herein and to show how they may be put into effect, reference is made by way of example to the accompanying drawings in which.

DETAILED DESCRIPTION OF EMBODIMENTS

The following describes a technique by which a device with a camera can detect its orientation, position or location based on a combination of coded light detection with geometric analysis. There is also described a coded-light enabled luminaire which is particularly beneficial for coded-light based localization. The technique comprises decoding the coded light to obtain an identifier (ID) of the source, obtaining the physical dimensions associated with the light source, and using geometric perspective calculations to determine the position of the camera from the appearance of the light source in the camera image. In a preferred embodiment, coded light is used to make the light source appear asymmetric to the camera, while it retains is symmetric appearance to the human eye. As the light source is symmetric in appearance to human users while it emits coded light in an asymmetric way, this may improve its usefulness as a location beacon without disrupting the users' experience of the illumination. In embodiments, the teachings disclosed in the following are applicable even for the case where only a single coded light source with a symmetric appearance is in view of the camera.

Figure 1:
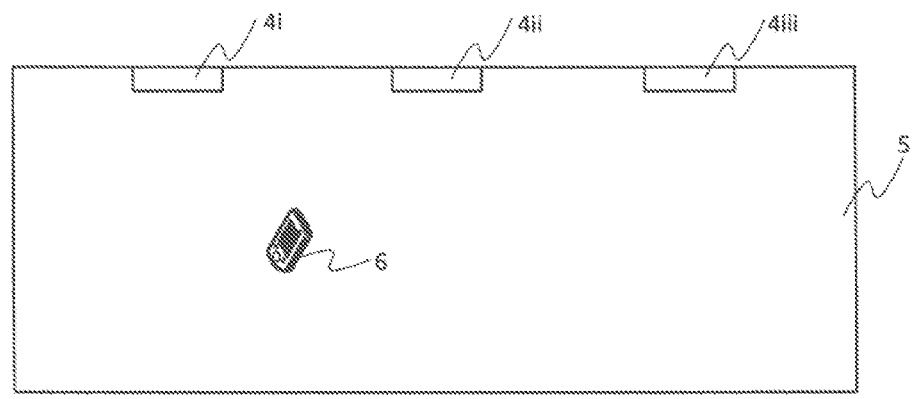
FIG. 1 schematically illustrates a space such as a room comprising at least one luminaire.

FIG. 1 shows an example space or environment 5 in which embodiments disclosed herein may be deployed. For instance the space 5 may comprise one or more rooms and/or corridors of an office, home, school, hospital, museum or other indoor space; or an outdoor space such as a park, street, stadium or the like; or another space such as a gazebo or the interior of a vehicle. The space 5 is installed with a lighting system comprising one or more lighting devices 4 in the form of one or more luminaires. Three luminaires 4i, 4ii and 4iii are shown for illustrative purposes, but it will be appreciated that other numbers may be present. The luminaires 4 may be implemented under central control or as separate, stand-alone units. Also present in the space 5 is a user terminal 6, preferably a mobile device such as a smart phone or tablet.

Figure 2:
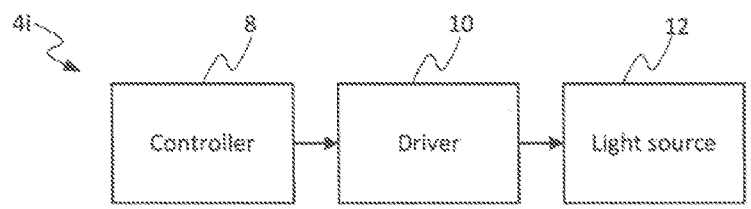
FIG. 2 is a schematic block diagram of a luminaire employing coded light transmission.

FIG. 2 gives a block diagram of a luminaire as may be used to implement one, some or all of the one or more luminaires 4. The luminaire 4 comprises a light source 12 comprising one or more light emitting elements such an LED, array of LEDs or fluorescent tube. The luminaire 4 also comprises a driver 10 coupled to the lighting source 12 and a controller 8 coupled to the driver 10. The controller 8 is configured to output a signal to the driver 10 in order to drive the light source 12 to emit a desired light output. The controller 8 may be implemented in the form of code stored on a computer readable storage medium or media and arranged to be executed on a processor comprising one or more processing units. Alternatively it is not excluded that some or all of the controller 8 is implemented in dedicated hardware circuitry or reconfigurable circuitry such as an FPGA. The controller 8 may be implemented locally at the luminaire 4 or at a central controller which may be shared with one or more other luminaires 4, or a combination of these. Generally the components 8, 10 and 12 may or may not be integrated into the same housing.

The controller 8 is configured to control the light emitted by the light source 12 to be modulated with a coded light component. Coded light refers to techniques whereby a signal is embedded in the visible light emitted by a luminaire. The light thus comprises both a visible illumination contribution for illuminating a target environment such as a room (typically the primary purpose of the light), and an embedded signal for providing information into the environment. To do this, the light is modulated at a certain modulation frequency or frequencies, typically a high enough frequency that the modulation is imperceptible to human vision. For example the modulation may take the form of a sinusoid, rectangular wave or other waveform. Typically the modulation frequency refers to the single or fundamental frequency of the modulation, i.e. the frequency of the period over which the waveform repeats. In some of the simplest cases, the signal may comprise a single tone modulated into the light from a given luminaire. In other cases, a signal comprising more complex data may be embedded in the light. For example using frequency keying, a given luminaire is operable to emit on two (or more) different modulation frequencies and to transmit data bits (or more generally symbols) by switching between the different modulation frequencies. In embodiments, each of a plurality of luminaires 4 in the same space 5 may be arranged to emit light modulated with a different respective coded light component acting as an identifier (ID) of the respective luminaire, so that the luminaire 4 from which the light came can be distinguished based on the ID. The IDs are unique at least amongst those luminaires in a certain space 5, e.g. in a certain room or building. In the case where the coded light component is a single tone, the different luminaires 4 may be arranged to emit light with different respective modulation frequencies which act as the IDs. Alternatively an ID could be encoded in data, e.g. using frequency keying. In yet further embodiments, alternative or additional data can be coded into the light.

Figure 3:
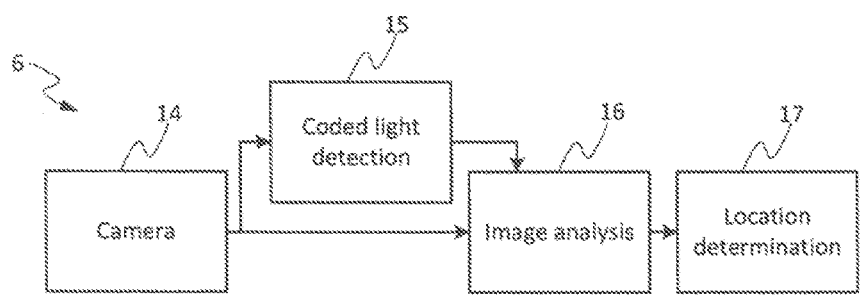
FIG. 3 is a schematic block diagram of a device with camera for capturing an image of a luminaire.

FIG. 3 gives a block diagram of the mobile device 6. The device 6 comprises a camera 14 having a two-dimensional image capture element, and a coded light detection module 15 coupled to the camera 14. The coded light detection module 15 is configured to process signals captured by the image capture element and detect coded light components in the light from which the image was captured. The device 6 also comprises an image analysis module 16 coupled to the camera 14, configured to determine a position of the camera 14 relative to the light source 12 of one of the luminaires 4i based on an image of the light source captured by that camera 14. Further, the device may comprise a location determination module 17 coupled to the image analysis module 16, configured to combine the position determined from the image analysis module with a location of the light source 4i to determine an absolute location of the camera 14. This may be the absolute geographic location relative to the surface of the earth, or an absolute location on a map such as a map of a town or plan of a building. If the camera 14 is housed within the same casing as the device, or physically mounted on its casing so as to move with the device 6 (as opposed to just being attached by, say, a flexible cable), then the position or location of the camera 14 may be taken as that of the device 6.

The coded light detection module 15, image analysis module 16 and/or location determination module 17 may be implemented in the form of code stored on a computer readable storage medium or media and arranged to be executed on a processor comprising one or more processing units. Alternatively it is not excluded that some or all of these components are implemented in dedicated hardware circuitry or reconfigurable circuitry such as an FPGA. Generally the components 14, 15, 16 and/or 17 may or may not be integrated into the same housing. Also it is not excluded that the coded light detection module 15 is coupled (uniquely or additionally) to a coded light sensitive detector different from camera 14, for example a second camera also available to the mobile device 6, or a photodiode available to the mobile device 6, and this may be used as an alternative way to detect the coded light in the following.

The one or more luminaires 4 are configured to emit light into the space 5 and thereby illuminate at least part of that environment. A user of the mobile device 6 is able to point the camera 16 of the device towards the light source 12 of one of the luminaires 4, say the luminaire labelled 4i by way of illustration. The camera 14 can thus capture an image of the light source 12. The light source 12 as described herein may refer to a visible part of the luminaire 4 (e.g. 4i) which comprises a light emitting element or light emitting elements. This will have a certain shape, e.g. a square, oblong or circle. For example this could be the shape of a single exposed light emitting element (e.g. shape of a fluorescent tube), the shape of an array of light emitting elements (e.g. an array of LEDs), the shape of a diffusion material that the one or more light emitting elements are housed behind, or the shape of a fitting or surround of one or more lighting elements (the shape of the light source is not strictly limited to being considered as just the shape of an individual lighting element or elements, though that is one possibility). When viewed by the camera 14 from a distance and typically also at an angle, then projected onto the two dimensional plane of the image capture element the shape of the light source 12 (its size and/or relative proportions) appears distorted according to the effect of perspective. For instance the light source may be viewed from below if mounted on a ceiling, e.g. see FIG. 4.

The image analysis module 16 can use this perspective distorted shape to determine the distance of the camera 14 from the light source 12 based on a geometric perspective calculation. The image analysis module 16 can also perform a geometric perspective calculation on the perspective distorted shape in order to determine the orientation of the camera 14 relative to the light source 12 (e.g. as a two or three dimensional angle or vector of a central axis of the camera's field of view). The combination of distance and orientation can be used to give a position of the camera 14 (e.g. a two dimensional position in the plane of the floor and/or ceiling, or even a three dimensional position). In embodiments this may be taken as the position of the device 6 itself. Details of suitable calculations for analysing the perspective distorted appearance of geometric shapes such as squares, oblongs and circles will be known to a skilled person.

However, in order to perform this calculation the image analysis module 16 will require some information on one or more actual dimensions of the light source 12, in order to compare the actual dimensions with the dimensions as they appear in the captured image of the light source 12. According to the disclosure herein, this information may be obtained based on a coded light signal embedded in the light from the light source 12 of the luminaire 4i being viewed by the camera 14.

In embodiments, this may be done based on the ID of the luminaire 4 (e.g. 4i) embedded in the light from the respective light source 12. In this case the ID may be used to look up the one or more required dimensions of the respective light source 12 in a suitable data store comprising a database or look-up table mapping IDs to information on corresponding light source dimension(s). For example the data store may be pre-stored in local storage within the device 6 itself, or may be implemented on a network such as a local network or a wide area network like the Internet. The coded light detection module 15 of the device 6 processes the light samples captured by the camera in order to detect the ID coded into the light, and then accesses the data store using a suitable network interface such as a local wireless connection (e.g. Wi-fi or Bluetooth) or cellular wireless connection (e.g. 3GPP). The coded light detection module 15 is thus able to submit the ID to the data store, receive back the information on the corresponding light source dimension(s), and passes this information to the image analysis module 16 for use in the perspective calculation.

In alternative or additional embodiments, the controller 8 may be configured to code the information on the one or more dimensions of the relevant light source 12 explicitly into the light emitted by the light source 12 of the respective luminaire 4i. In this case, the coded light detection module 15 is able to retrieve the information directly from the light emitted by the relevant light source 12, and pass this information to the image analysis module 16 for use in the perspective calculation.

In either case, the device 6 is advantageously to obtain the actual dimension(s) of the light source 12 based on the same image of the same object that the camera is viewing in order to obtain the apparent, perspective distorted dimension(s).

The information on the one or more dimensions of the light source 12 may be sufficient to determine a distance of the camera 14 from that light source 12. For example, the information may comprise an indication that the light source 12 is circular and an indication of its radius, diameter or circumference. This would allow the image analysis module 16 to determine the distance from the light source 12. Similarly if the light source 12 is square then the distance can be determined from an indication of a side of the square and an indication that the shape is a square, or if the light source 12 is oblong the distance can be determined from an indication of two sides, or one side and a ratio of the sides, and indication that the shape is an oblong or rectangle. If pre-designed for a particular environment, the image analysis module 16 could even be pre-configured to assume the shape is, say, circular or square, or could be configured to estimate the type of shape from the perspective distorted image, in which cases as a bare minimum the image analysis module 16 need only be provided with a single measurement of the radius or edge for example.

However, it is noted that the shape of many light sources will have a symmetry. For example the shape may have a rotational symmetry, i.e. an order of rotational symmetry of at least two. The order of rotational symmetry is the number of times in a shape would match or repeat itself when rotated through a full 360 degree circle about some axis, or equivalently viewed about a full 360 degrees around that axis. An order of one does not represent rotationally symmetry. Note also this does not mean the light source 12 actually has to be able to rotate, just that the shape would have this property if rotated, or equivalently viewed from different angles. The shape of the light source may also or alternatively have a mirror symmetry (also referred to as reflection symmetry or line symmetry). That is, the shape would be identical to itself if reflected or flipped about one or more lines of symmetry (note again, this does not necessarily mean the light source actually has to be physically flipped, just that the shape would have this property if flipped). In a typical application the light source 12 will be mounted on a surface such as ceiling or perhaps a wall, and the symmetry is a symmetry in the plane of this surface. If it is desired to know the orientation of the camera 14 relative to the light source, such symmetry will introduce an ambiguity into the calculation.

Figure 4:
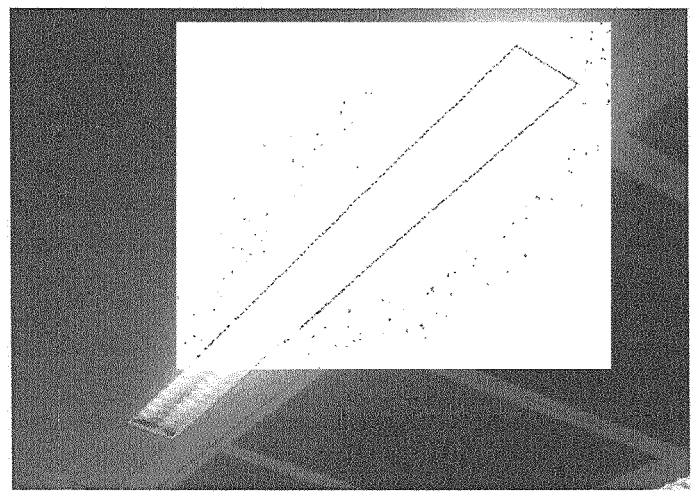
FIG. 4 shows an image of a luminaire installed on a ceiling, overlaid with a schematic illustration of the perspective distorted shape of the luminaire as appearing in the image.
Figure 5:
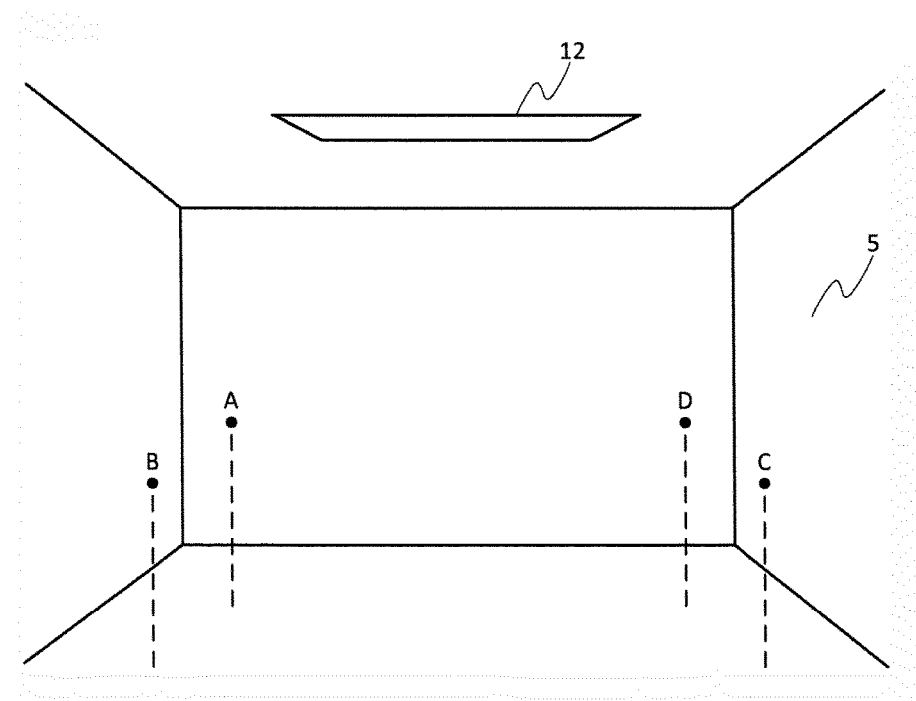
FIG. 5 schematically illustrates a perspective view of a luminaire installed in a space such as a room.
Figure 6:
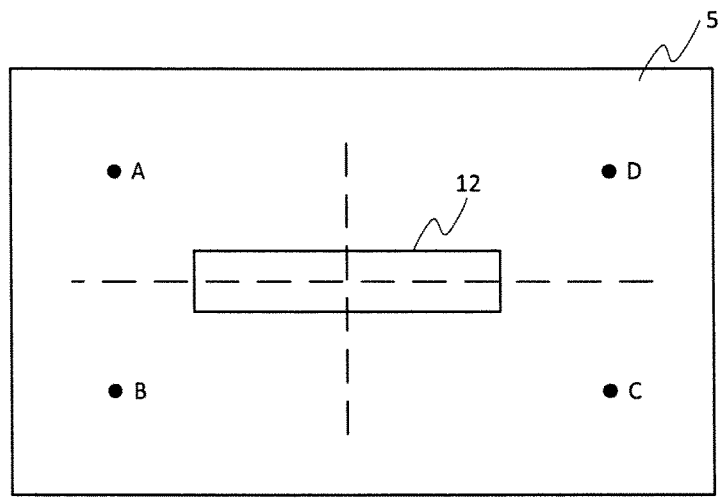
FIG. 6 gives a schematic top-down (or bottom-up) view of the luminaire of FIG. 5, FIG. 7 schematically illustrates a light source with symmetry breaking sections.

To illustrate this, if an oblong luminaire as shown in FIG. 4 emits coded light with its ID is embedded therein, a coded light detector with the viewpoint shown in FIG. 4 will be able to determine (from the ID) which luminaire it is near. Assuming the coded light is emitted substantially uniformly along the length of its light source, then as far as the coded light detector is concerned the luminaire will have 180-degree rotational symmetry. Similarly, a square luminaire would have 90-degree rotational symmetry or a circular luminaire would appear the same from any angle. So based on this information the detector could 'know' which luminaire it is near and potentially how far it is from the luminaire, but would not know which direction it is facing in. Typically, because the light source outline has a symmetric appearance, there are multiple candidate locations in the room from which the light source outline would appear this way. This is illustrated for the case of 90-degree rotational symmetry schematically in FIGS. 5 and 6. Given the image data in FIG. 4 and the known dimension(s) of the light source 12, the detector can limit the number of possible locations from which it is viewing the light source to four locations (or orientations) in a room with respect to the light source 12, indicated by A, B, C, and D in FIGS. 5 (perspective view) and 6 (top-down view). For a mirror symmetric light source, generally there would be two positions that cannot be disambiguated, e.g. position A and B in FIG. 5.

Therefore without further modification, a coded light detector would need to have at least two such luminaires in its field of view in order to know its orientation from the image, or otherwise the orientation would have to be obtained by alternative means.

To address this, the present disclosure provides a light source which when off is symmetric, but when on emits lights asymmetrically. To achieve this, the light source may be divided into different sections which emit light differently in order to break the symmetry. Preferably the asymmetry is perceptible to the camera 14 but not to human vision. This may be implemented as a coded-light enabled luminaire with an asymmetric distribution of coded light.

Figure 8:
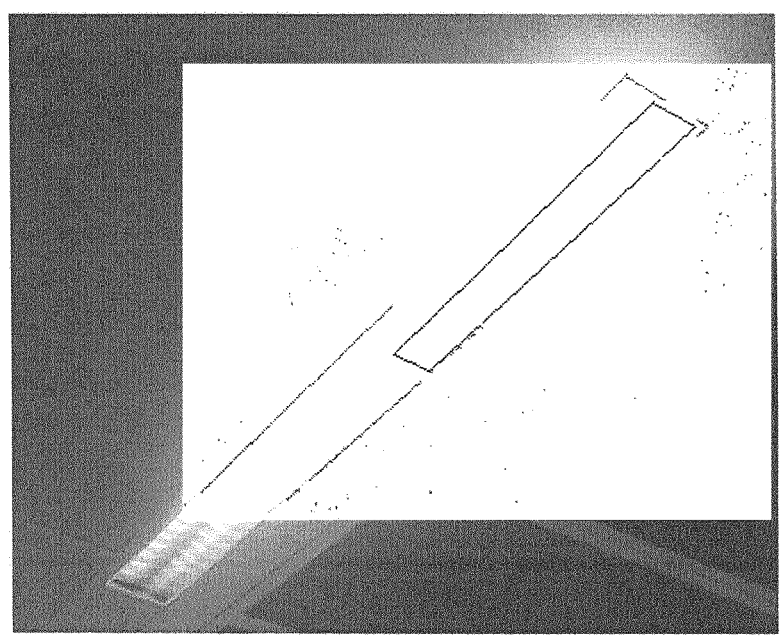
FIG. 8 shows an image of a luminaire installed on a ceiling, overlaid with a schematic illustration of symmetry-breaking sections similar to those of FIG. 7.

FIG. 8 illustrates a coded light enabled luminaire—the light emitted from within the inner section (shown schematically by an inner, rectangular line superimposed on the image) is distinguishable from the rest of the light emitted by the luminaire.

For instance, in a luminaire with two or more tubes, the tubes may be arranged to emit mutually different coded light, or only one of the tubes emits coded light. Numerous other embodiments are possible, e.g. as discussed below. Thus the coded light detection module 15 can pass this information to the image analysis module 16, which can thus, because of the lack of symmetry, determine unambiguously the camera's orientation in the geometric perspective calculation—even when only one of the luminaires 4i is in its field of view.

Consider the images of lamps in FIG. 4 and FIG. 8 as captured by an upwards-facing smart phone type camera. In both images, only a single (switched on) light source is visible in the field of view. These light sources emit an ID in the form of coded light. The location determination proceeds as follows.

The image analysis module 16 analyses the image to locate the light source 12. Also, the coded light detection module 15 decodes the coded light emitted by the light source 12 to obtain the ID of that light source. The coded light detection module 15 uses the ID to obtain geometric data, which may comprise the shape of the (visible parts of) the light source 12, and optionally the location of the source in the building. In an alternative embodiment, geometric data is encoded directly in the coded light. Either way, the coded light detection module 15 passes the geometric data to the image analysis module 16. The image analysis module 16 recognises the shape in the image. For example, the outline can be recognised with edge detection, e.g. see the outer line superimposed on the image shown in FIG. 8.

By using the known size of the outline and matching it to the perspective-distorted shape as it appears in the image, the distance and angle to the light source can be determined. Typically, because the light source outline has a symmetric appearance, there are multiple candidate locations in the room from which the light source outline would appear this way. Here, the outline has 2 axes of symmetry, leading to four possible locations in the room A, B, C and D. See FIGS. 5 and 6.

Figure 7:
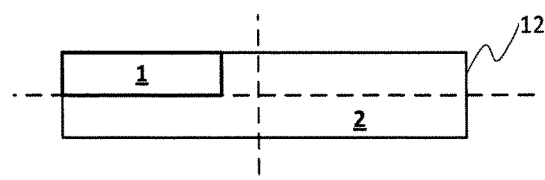

To disambiguate between these possible positions, the image analysis module 16 uses the fact that the light source is equipped with a coded light generation means that breaks the symmetry. For example, as shown in FIG. 7 (bottom view of the light source), the light emitting part of the source is divided into two zones or sections, 1 and 2. Section 1 emits coded light, whilst section 2 does not, or emits another coded light code, or the same code but encoded in a way so that the two sections can be distinguished. To disambiguate, the location or shape of one section of the coded light emission is determined, e.g. see the inner line superimposed on the image shown in FIG. 8. This compared with other geometric aspects that have been determined. The end result is that the location of the camera with respect to the light source 12, and therefore the location of the device in the room (and by extension the building), can be unambiguously determined.

To inform the image analysis module 16 about which of the different asymmetric views corresponds to which of the otherwise ambiguous directions, information on the asymmetric configuration of the luminaire 4i may also be communicated to the device 6 based on coded light. For example, the coded light detection module many detect the ID of the luminaire 4i in the code light it emits, and use this to look up certain characteristic dimensions of the different section 1,2 in a local or remote data store mapping IDs to dimensions (similarly to the technique described in relation to obtaining the overall dimensions(s) of the luminaire). In another example, the information could be coded explicitly into the coded light emitted from the luminaire 4i, and retrieved directly from the coded light by the coded light detection module 15. Alternatively the image analysis module 16 could be pre-configured with the information on the expected asymmetry, if it is intended to work with a particular design of luminaire or in a particular environment.

Figure 9:
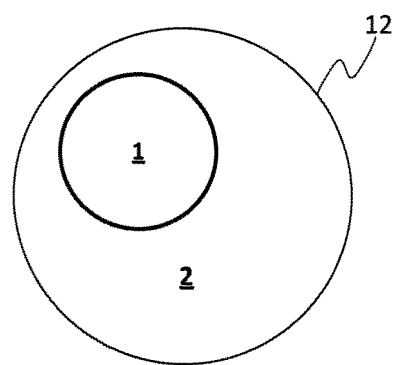
FIG. 9 schematically illustrates another light source with symmetry breaking sections.
Figure 10:
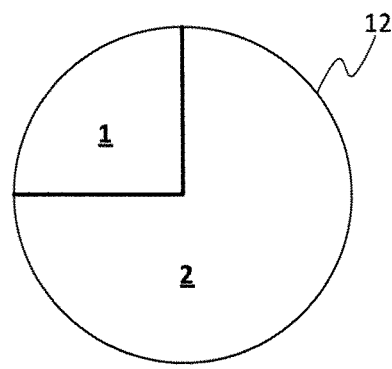
FIG. 10 schematically illustrates yet another light source with symmetry breaking sections.

FIGS. 9 and 10 show alternative options for realising asymmetric coded light in a light source with a circular emission opening, and therefore rotational symmetry. FIG. 9 schematically illustrates an inner circular section 1 offset from the centre of the wider circular light source, i.e. having a different centre. The second section 2 is the rest of the circular light source area not taken up by section 1. In FIG. 10, section 1 is a wedge or "pie slice" of the circle and section 2 is the rest of the circle. Similarly to the example of FIG. 7, one of the two sections 1, 2 emits coded light while the other does not, or the two sections emit differently coded light.

Figure 11:
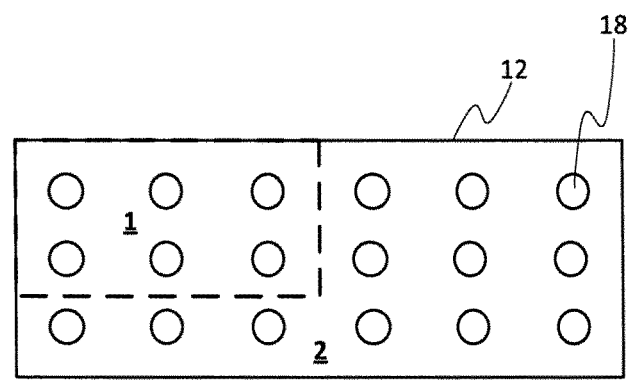
FIG. 11 schematically illustrates a light source with alternative means for creating symmetry breaking sections.

FIG. 11 gives another example. Here the underside of an LED luminaire is illustrated with the light diffusion material taken off and the individual LED elements shown as small circles 18. The LEDs are divided into different, asymmetric sections. The LEDs in zone 1 may be driven with coded light, while the remaining LEDs in zone 2 may be driven with 'normal' light or differently coded light.

Figure 12:
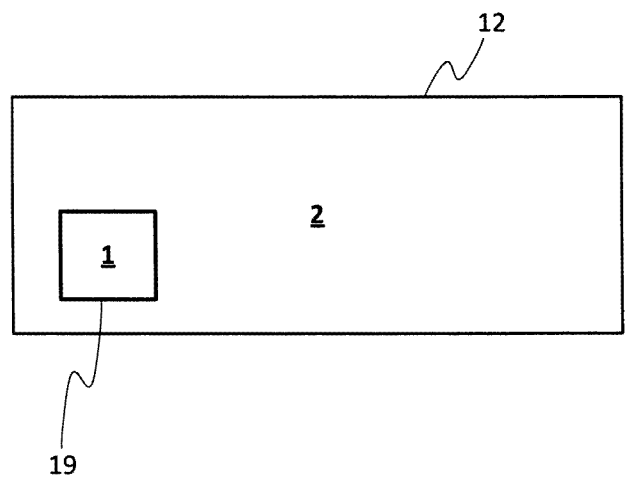
FIG. 12 schematically illustrates a light source with another alternative means for creating symmetry breaking sections.

In another example, FIG. 12 shows the underside of a fluorescent tube luminaire with a retrofit coded light emitter (small square) 19. By putting the emitter in an asymmetric location, this provides another way to implement asymmetric coded light output.

Once the distance and orientation of the camera 6 have been determined, the location determination module 17 may use this information to fine tune a location estimate of the camera 16 or device 6. For instance, the location determination module may be configured to obtain a rough estimate of the device's absolute location by obtaining the location of the luminaire 4i being viewed. E.g. this may be done by detecting the ID of the luminaire 4i from the coded light emitted by that luminaire's light source 12 and looking up the ID of the luminaire in a data store mapping IDs to luminaire coordinates, or the coordinates may be coded directly into the coded light emitted by that luminaire's light source. The position of the device 6 relative to the luminaire 4i can then combined with the absolute location of the luminaire, e.g. adding a vector, to obtain the absolute location of the device 6.

Such techniques may for example find applications in location systems such as location based advertising, or indoor navigation by humans or robots.

It will be appreciated that the embodiments set out above have been described only by way of example.

Generally, the determination of distance from a luminaire and orientation relative to a luminaire may be used independently of one another or together. Also, the information does not have to be used to ultimately determine an absolute location of the camera 16 or device 6. For example, it may be useful just to obtain the orientation of the camera 16 from the image of the light source. For example, the device may determine its coordinates from other means such as GPS but not have a measure of its orientation, in which case it may determine the orientation from the image of the light source 12 and combine this with the GPS coordinates, e.g. to add a directional arrow onto the location indicator on a map application. In another example, say in an indoor navigation application, the user may just desire to know which way to go along a corridor. Further, where an asymmetric light emission is employed to break a symmetry in the light source, this may be achieved using other means than coded light. For example different sections of the light source 12 may be arranged to emit differently polarised light in an asymmetric fashion. Further, it may not always be necessary that the asymmetric light emission breaks all symmetries, e.g. all orders of rotational symmetry. For example, if the light source is rectangular and it is only desired to be able to tell which way the camera 16 or device 6 is facing along a corridor, the light may only break the symmetry along the length of the corridor.

In the examples above, the symmetry has been described as being broken by dividing the light source into different spatial sections 1 or 2. In further embodiments the idea is not limited to dividing the light source into just two different sections or to the particular configurations illustrated, and other configurations may be used based on other numbers of sections that enable the unwanted ambiguity to be resolved. Further, in other embodiments the idea is not limited to using different spatial sections of the light source to break the symmetry. For example, the light source could be configured to emit different light at different angles, e.g. emitting light coded with one code along one direction of a corridor and light coded with another code along the other direction of the corridor.

In yet further embodiments, the analysis may also use other objects appearing in the image to further refine the geometric perspective calculation. For example it could use geometric features of other objects on the ceiling (e.g. ceiling panels with visible edges) in its calculations.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A ceiling mountable luminaire for illuminating an environment, and for use in determining an orientation of a camera based on an image of the ceiling mountable luminaire captured by the camera, the ceiling mountable luminaire comprising:
   a light source having an on state in which it emits light and an off state in which it does not emit light, the light source being of a shape having a symmetry;
   a controller configured to control the light source with different modulations in different regions of said light source to emit said light in the on state with a lighting effect having an asymmetric lighting distribution, wherein said lighting effect is imperceptible to human vision and perceptible to the camera, the light source being arranged to emit said light with said symmetry that is visible to a human, whilst the asymmetric lighting distribution is detected by the camera.

2. The ceiling mountable luminaire of claim 1, wherein the ceiling mountable luminaire is for mounting on a surface defining a plane, the symmetry being in the plane of said surface.

3. The ceiling mountable luminaire of claim 2, wherein the lighting effect has no symmetry in the plane of said surface.

4. The ceiling mountable luminaire of claim 1, wherein the controller is configured to produce said lighting effect using coded light.

5. The ceiling mountable luminaire of claim 1, wherein the light source is divided into asymmetric sections, and the controller is configured to produce said lighting effect by emitting the light differently from the different sections.

6. The ceiling mountable luminaire of claim 5, wherein the controller is configured to produce said lighting effect by emitting differently coded light from each of said sections, or emitting coded light from one of the sections while emitting non coded light from another of the sections.

7. A device comprising:
   an input for receiving image data from a camera, the image data comprising an image of a light source which emits light and is of a shape having a symmetry;
   at least one hardware processor configured to perform an image analysis and determine an orientation of the camera relative to the light source by performing a geometric perspective calculation based on the image of the light source;
   wherein the at least one hardware processor is configured to resolve ambiguity in the orientation by detecting a lighting effect having an asymmetric lighting distribution in the light emitted by the light source, and
   wherein said lighting effect is imperceptible to human vision and perceptible to the camera, the light source being arranged to emit said light with said symmetry that is visible to a human, whilst the asymmetric lighting distribution is detected by the camera.

8. The device of claim 7, wherein said lighting effect comprises coded light to form the asymmetric lighting distribution, and the at least one hardware processor is configured to detect said coded light and said effect and thereby resolve the ambiguity based on the detected coded light.

9. The device of claim 7, wherein the at least one hardware processor is further configured to detect a distance of the camera relative to the light source as part of the geometric perspective calculation, the distance and the orientation together giving a position of the camera relative to the light source.

10. The device of claim 9, wherein the at least one hardware processor is configured to obtain a geographic location of the light source, and to determine a geographic location of the camera based on the geographic location of the light source combined with the position of the camera relative to the light source.

11. The device of claim 7, wherein the image data further comprises images of one or more other objects, and the at least one hardware processor is configured to also include the images of the one or more other objects in the geometric perspective calculation.

12. The device of claim 7, wherein the device comprises the camera.

13. A device comprising:
   an input for receiving image data from a camera, the image data comprising an image of a light source which emits light and is of a shape having a symmetry;
   at least one hardware processor configured to perform an image analysis and determine an orientation of the camera relative to the light source by performing a geometric perspective calculation based on the image of the light source;
   wherein the at least one hardware processor is configured to resolve ambiguity in the orientation by detecting a lighting effect having an asymmetric lighting distribution in the light emitted by the light source, and wherein the image data comprises an image of a single light source, the at least one hardware processor being configured to determine the distance of the camera from said light source by performing the geometric perspective calculation to compare one or more retrieved physical dimensions of the single light source with one or more apparent dimensions of the image of the single light source.

14. A computer program product embodied on a non-transitory computer readable storage medium storing a computer program this is configured to cause a processor executing the program to perform operations of:

receiving image data from a camera, the image data comprising an image of a light source which emits light and is of a shape having a symmetry;

determining an orientation of the camera relative to the light source by performing a geometric perspective calculation based on the image of the light source; and resolving an ambiguity in the orientation by detecting a lighting effect having an asymmetric lighting distribution in the light emitted by the light source, and wherein said lighting effect is imperceptible to human vision and perceptible to the camera, the light source being arranged to emit said light with said symmetry that is visible to a human, whilst the asymmetric lighting distribution is detected by the camera.

* * * * *